(12) United States Patent
Zhang et al.

(10) Patent No.: US 11,966,379 B2
(45) Date of Patent: Apr. 23, 2024

(54) METHOD AND SYSTEM FOR PERFORMING DATA TRANSFER IN A COMPUTING DEVICE WITH ZERO DOWNTIME AND MINIMUM MAINTENANCE

(71) Applicant: Dell Products L.P., Round Rock, TX (US)

(72) Inventors: Grace Hongyan Zhang, Pflugerville, TX (US); Syed Mohammad Shams Kazmi, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 96 days.

(21) Appl. No.: 17/739,781

(22) Filed: May 9, 2022

(65) Prior Publication Data
US 2023/0359608 A1  Nov. 9, 2023

(51) Int. Cl.
*G06F 16/00* (2019.01)
*G06F 16/23* (2019.01)

(52) U.S. Cl.
CPC .................. *G06F 16/2343* (2019.01)

(58) Field of Classification Search
CPC .................................................. G06F 16/2343
See application file for complete search history.

(56) References Cited

U.S. PATENT DOCUMENTS

| | | | |
|---|---|---|---|
| 2004/0225671 A1* | 11/2004 | Carroll | G06F 16/254 |
| 2005/0209876 A1* | 9/2005 | Kennis | G06Q 10/06393 |
| | | | 726/1 |
| 2012/0089566 A1* | 4/2012 | Effern | G06F 16/2379 |
| | | | 707/611 |
| 2019/0079682 A1* | 3/2019 | Bikumala | G06F 11/2097 |
| 2020/0159746 A1* | 5/2020 | Suriarachchi | G06F 16/2379 |
| 2023/0195582 A1* | 6/2023 | Fleckenstein | G06F 16/2365 |
| | | | 707/684 |

* cited by examiner

*Primary Examiner* — Syed H Hasan
(74) *Attorney, Agent, or Firm* — Chamberlain, Hrdlicka, White, Williams, & Aughtry; Aly Z. Dossa

(57) ABSTRACT

A method for performing data transfer includes: obtaining source data; populating a staging table with the source data; making a first determination that the source data was successfully populated to the staging table; making a second determination that a target table is available, in which an application is directed to use data in the target table; and initiating, based on the first determination and the second determination, a data source switch of the application, in which the data source switch directs the application to use the source data in the staging table and not use the data in the target table, in which the application uses the source data in the staging table when the data source switch is successful.

13 Claims, 8 Drawing Sheets

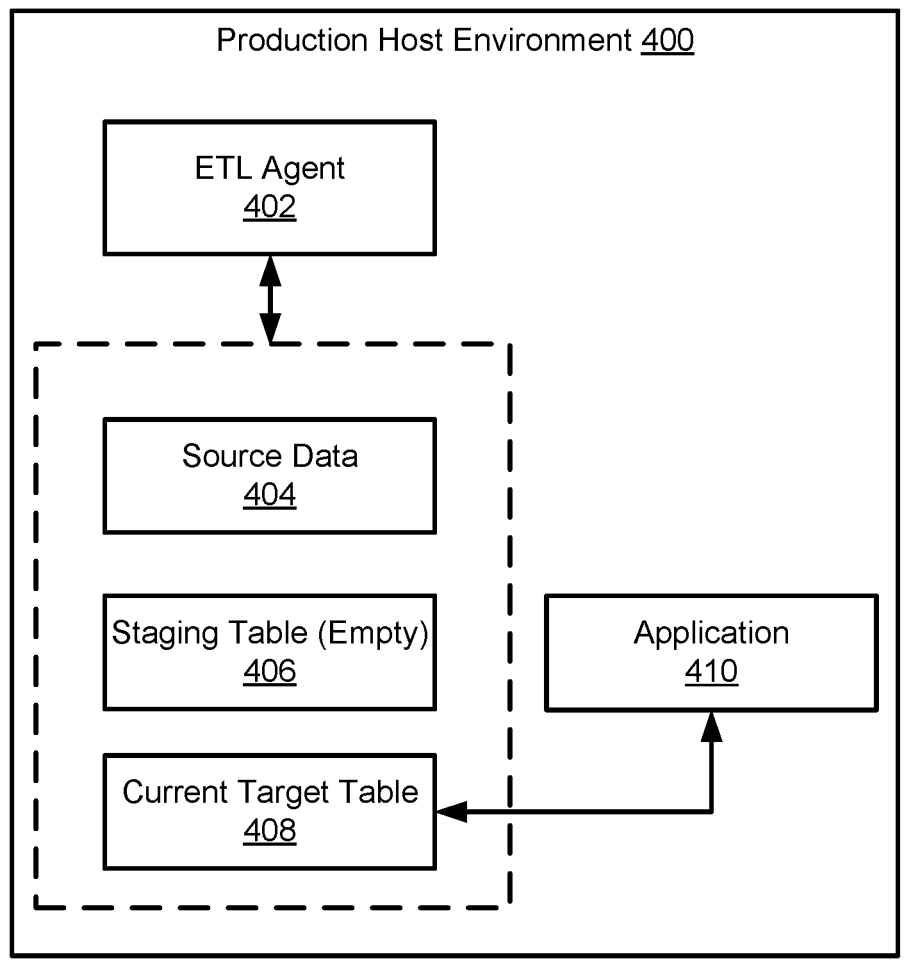
FIG. 4.1

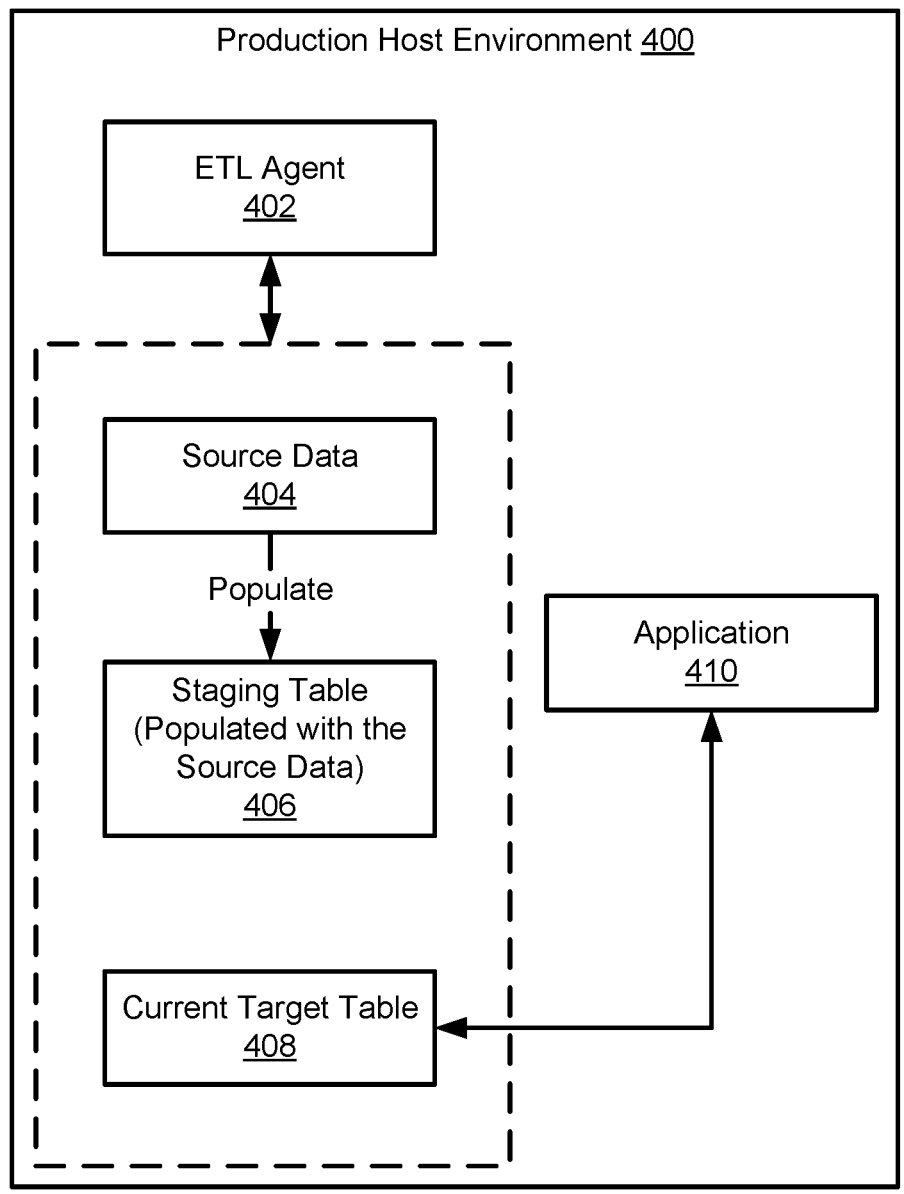
FIG. 4.2

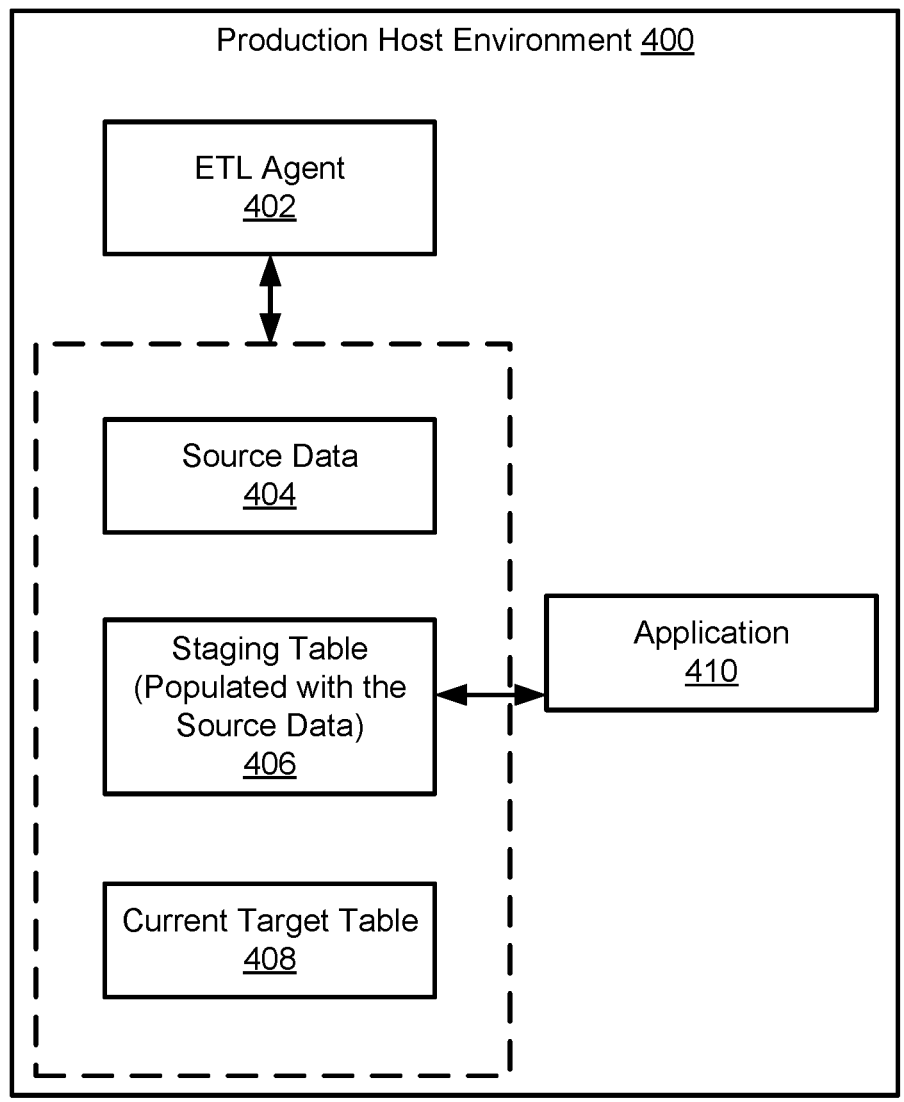
FIG. 4.3

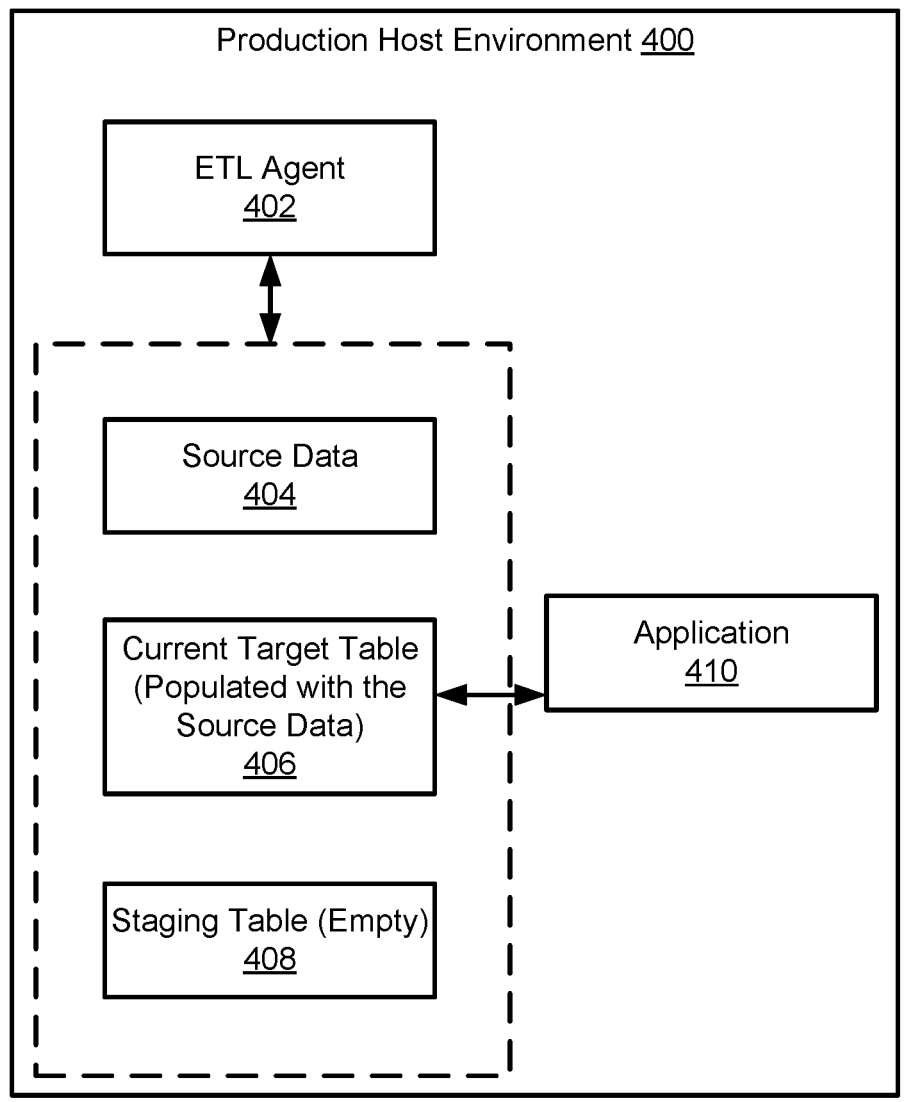
FIG. 4.4

METHOD AND SYSTEM FOR PERFORMING DATA TRANSFER IN A COMPUTING DEVICE WITH ZERO DOWNTIME AND MINIMUM MAINTENANCE

BACKGROUND

Computing devices in a system may include any number of internal components such as processors, memory, and persistent storage. The computing devices may execute applications (e.g., software). Each application may need to access a newer version of data based on a user's request.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example, and are not meant to limit the scope of the claims.

FIGS. 4.1-4.4 show an example system in accordance with one or more embodiments disclosed herein.

DETAILED DESCRIPTION

Figure 1:
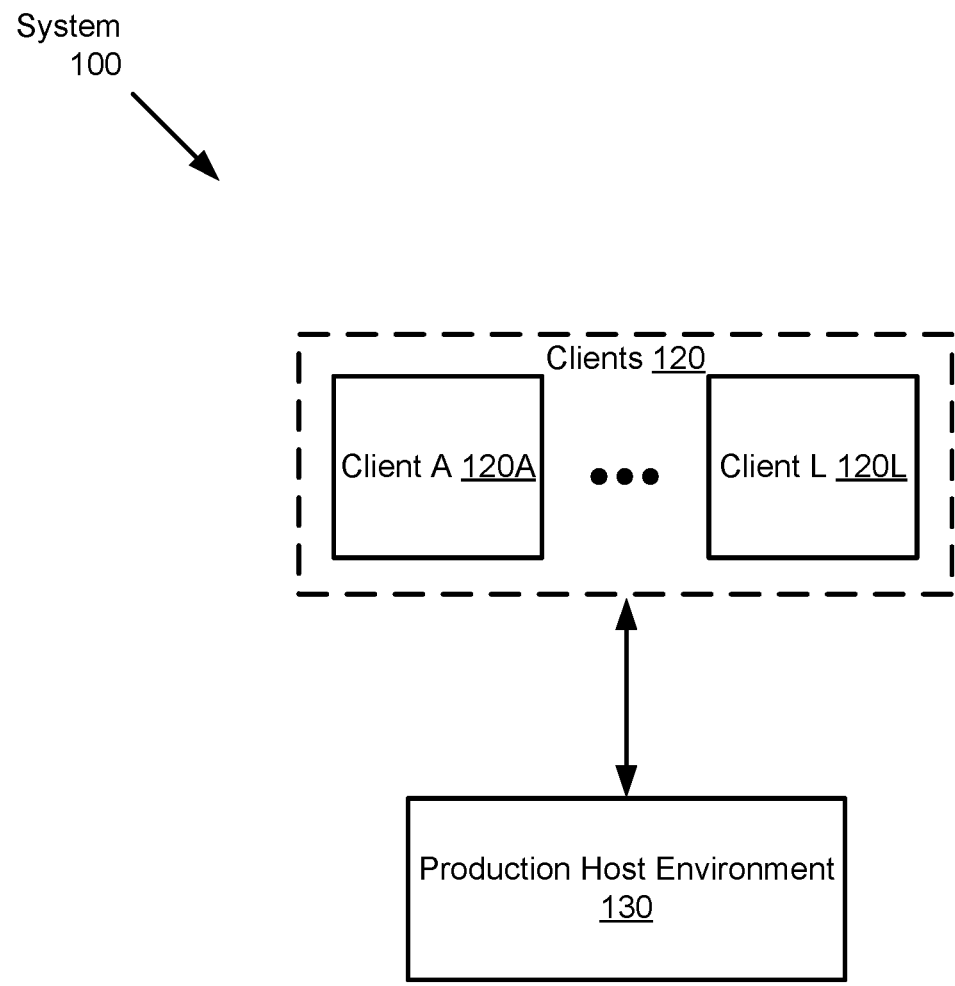
FIG. 1 shows a diagram of a system in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding of one or more embodiments disclosed herein. However, it will be apparent to one of ordinary skill in the art that the embodiments disclosed herein may be practiced without these specific details. In other instances, well-known features have not been described in detail to avoid unnecessarily complicating the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, conventional data transfer techniques usually take longer than expected to complete. At times, data may also not be available (e.g., data loss during transfer, data corruption, etc.) after the data transfer has been performed. Due to the longer processing times of these conventional data transfer techniques, performance of other concurrent processes in a system may also be affected. Embodiments disclosed herein relate to a method and system for performing data transfer with zero downtime and minimum maintenance. More specifically, various embodiments disclosed herein receive a request to access a newer version of data from a user of a client (e.g., computing device). In this manner, source data is obtained and populated into a staging table. If the source data was successfully populated into the staging table and a target table is available, then a lock on the target table will be obtained. A data source switch of an application will be initiated and the application will be updated to treat the staging table as a target table. If the data source switch of the application was successful, then the previous target table will be truncated (i.e., deleting all data and/or records from the table). This advantageously provides a close to instantaneous data transfer with minimum maintenance requirement by ensuring data availability at any time during the entire data transfer process.

The following describes various embodiments disclosed herein.

FIG. 1 shows a diagram of a system in accordance with one or more embodiments disclosed herein. The system includes one or more clients (client A (120A), client L (120L)) operatively connected to a production host environment (130). The system (100) may include additional, fewer, and/or different components without departing from scope of the embodiments disclosed herein. Each component may be operably connected to any of the other component via any combination of wired and/or wireless connections. Each component illustrated in FIG. 1 is discussed below.

In one or more embodiments disclosed herein, the clients (120) may be devices (which may be physical or logical, as discussed below) that request an access of a newer version of data. The clients (120) may also be directly or indirectly connected to the production host environment (130), such that each of the clients (client A (120A), client L (120L)) provides logs to the production host environment (130) for performing data transfer. The data transfer will be discussed in more detail below.

Figure 5:
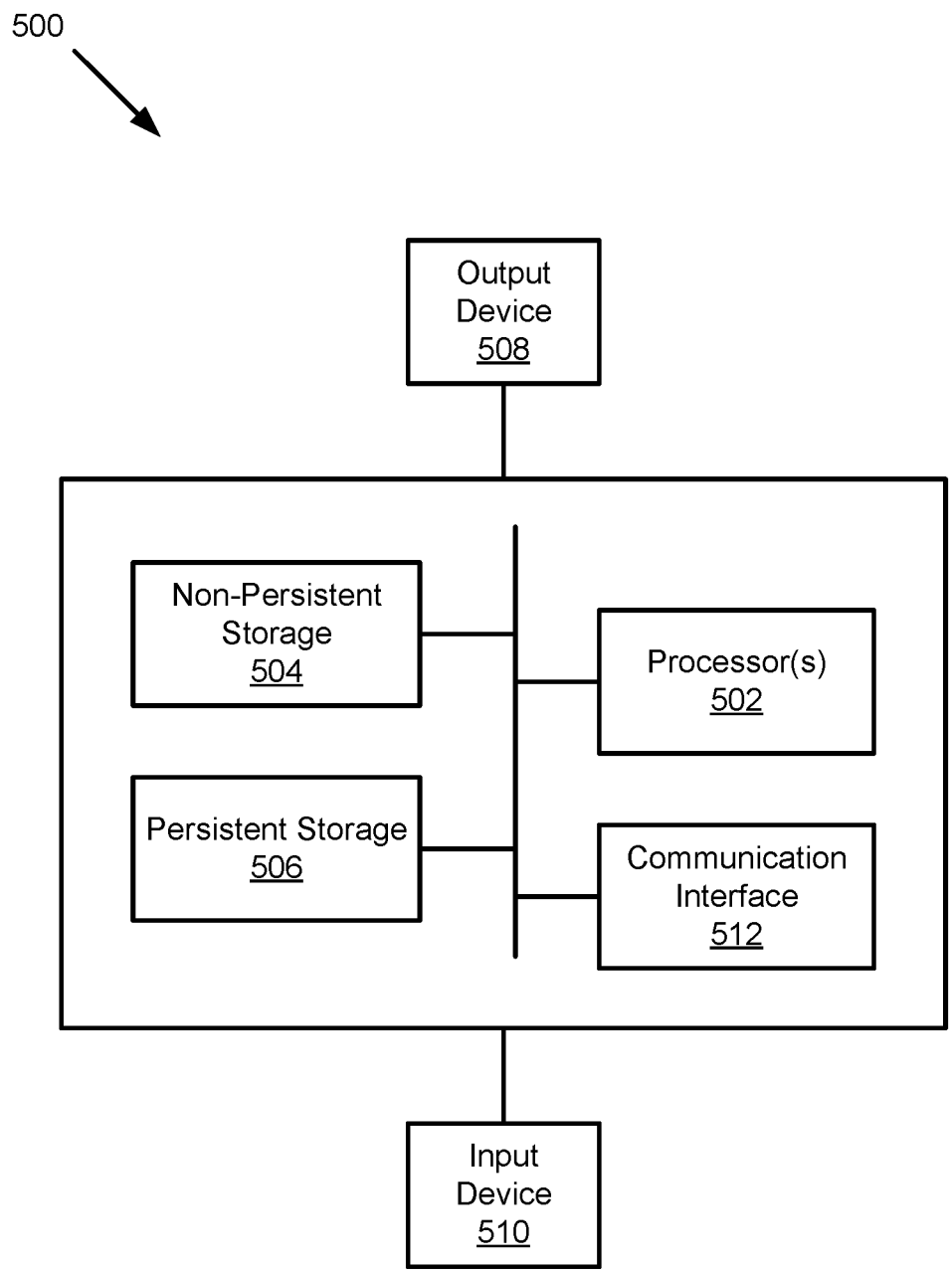
FIG. 5 shows a diagram of a computing device in accordance with one or more embodiments disclosed herein.

In one or more embodiments disclosed herein, each client (client A (120A), client L (120L)) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device, cause the computing device to perform the functionality of each client (client A (120A), client L (120L)) described throughout this application.

In one or more embodiments disclosed herein, each client (client A (120A), client L (120L)) may be implemented as a logical device. The logical device may utilize the computing resources of any number of computing devices to provide the functionality of the client (client A (120A), client L (120L)) described throughout this application.

In one or more embodiments disclosed herein, the production host environment (130) performs the data transfer based on a request (e.g., a data transfer request) received from the user. Additional details regarding the production host environment (130) are described below in reference to FIG. 2.

In one or more embodiments disclosed herein, the production host environment (130) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host environment (130) described throughout this application.

Alternatively, in one or more embodiments disclosed herein, similar to the each client (client A (120A), client L (120L)), the production host environment (130) may also be implemented as a logical device, as discussed above.

Figure 2:
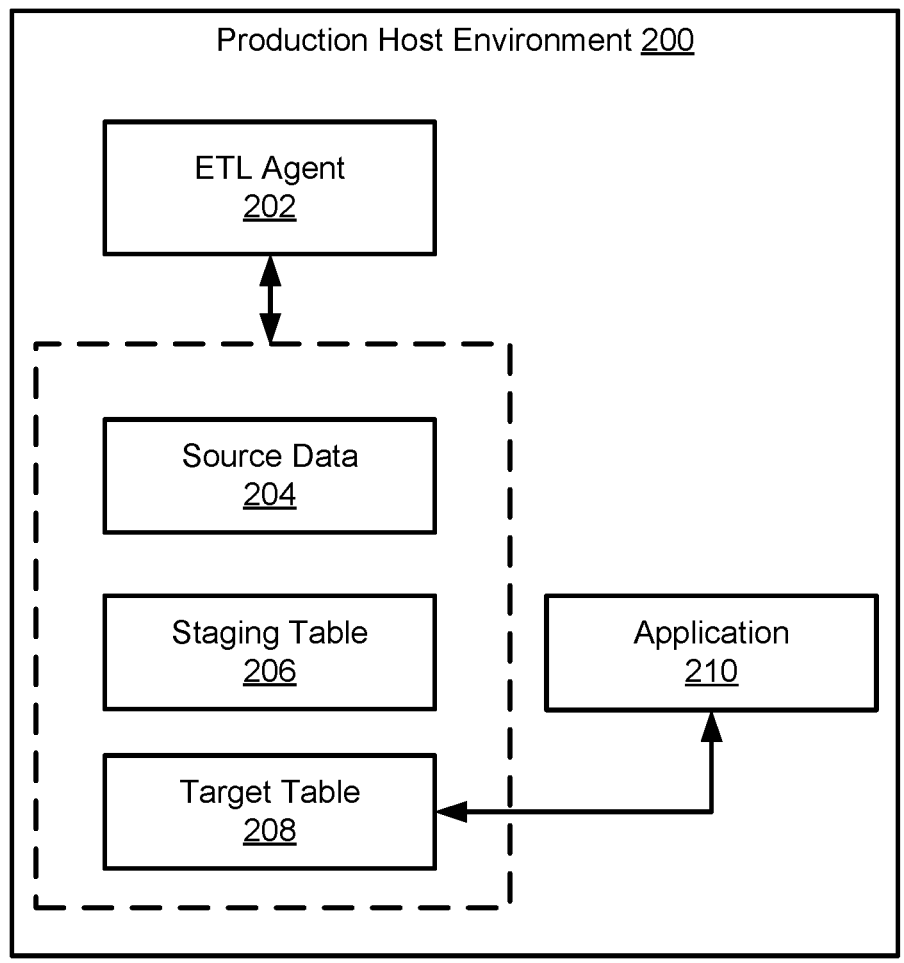
FIG. 2 shows a diagram of a production host environment in accordance with one or more embodiments disclosed herein.

Turning now to FIG. 2, FIG. 2 shows a diagram of a production host environment in accordance with one or more embodiments disclosed herein. The production host environment (200) may be the production host environment (e.g., 130, FIG. 1) discussed above. The production host environment (200) may include an Extract, Transform, and Load (ETL) agent (202), source data (204), a staging table (206), a target table (208), and an application (210). The production host environment (200) may include additional, fewer, and/or different components without departing from the scope of the embodiments disclosed herein. Each component may be operably connected to any of the other component via any combination of wired and/or wireless connections. Each component illustrated in FIG. 2 is discussed below.

In one or more embodiments disclosed herein, the ETL agent (202) monitors and/or controls the data transfer procedure. The ETL agent (202) may receive a request from the client (e.g., client A (120A), client L (120L), FIG. 1) to obtain the source data (204). In one or more embodiments disclosed herein, the ETL agent (202) may determine whether the source data (204) is successfully populated to the staging table (206). The ETL agent (202) may also determine whether the target table (208) is available. Based on both determinations, the ETL agent (202) may initiate a data source switch of an application (210), in which the application will be updated to treat the staging table (206) as a target table (208).

Those skilled in the art will appreciate that while the ETL agent (202) is described as an agent that performs the above procedures, the ETL agent may perform any other procedures related to data processing without departing from the scope of the embodiments disclosed herein.

In one or more embodiments disclosed herein, the ETL agent (202) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the ETL agent (202) described throughout this application.

Alternatively, in one or more embodiments disclosed herein, similar to the clients (e.g., 120, FIG. 1), the ETL agent (202) may also be implemented as a logical device, as discussed above.

In one or more embodiments disclosed herein, the source data (204) may be any type of data (e.g., medical history data, transactional data, etc.) that can fit in a small size table (e.g., a table with no more than 100 columns by $10^6$ rows) and/or a medium size table (e.g., a table with no more than 100 columns by $10^7$ rows). In one or more embodiments disclosed herein, the staging table (206) and the target table (208) may be located (e.g., stored) in a database in the production host environment (200). The staging table (206) and the target table (208) may also have the same data structure (e.g., matching columns and indexes). In one or more embodiments disclosed herein, the staging table (206) and the target table (208) may be data structures (e.g., lists, tables, etc.) of any size. For example, the staging table (206) and the target table (208) may be the above-discussed small size table and medium size table in which the source data (204) is stored.

Those skilled in the art will appreciate that while the source data (204) is described as data that can fit in a small size table and/or a medium size table, the source data may fit into tables of any size (e.g., large tables, micro tables, etc.) without departing from the scope of the embodiments disclosed herein.

In one or more embodiments disclosed herein, the application (210) may be logical entities executed using computing resources (not shown) of the clients (e.g., 120, FIG. 1). Each of the applications may perform similar or different processes. In one or more embodiments disclosed herein, the application (210) provides services to users. For example, the application (210) may host components. The components may be, for example, instances of databases, email servers, and/or other components. The application (210) may host other types of components without departing from the scope of the embodiments disclosed herein. The application (210) may be executed on one or more clients as instances of the application.

In one or more embodiments disclosed herein, based on one or more requests received from the clients (e.g., 120, FIG. 1), the application (210) may provide its services to the user using the target table (208), in which the target table becomes the previous target table upon completion of the data source switch. Additional details regarding the data source switch are described below in reference to FIG. 3.

In one or more embodiments disclosed herein, the target table becoming the previous target table upon the completion of the data source switch is described in more detail below in reference to FIGS. 4.1-4.4.

In one or more embodiments disclosed herein, the application (210) may be implemented as computer instructions, e.g., computer code, stored on persistent storage that when executed by a processor(s) of a computing device cause the computing device (not shown) to provide the functionality of the application described throughout this application.

Figure 3:
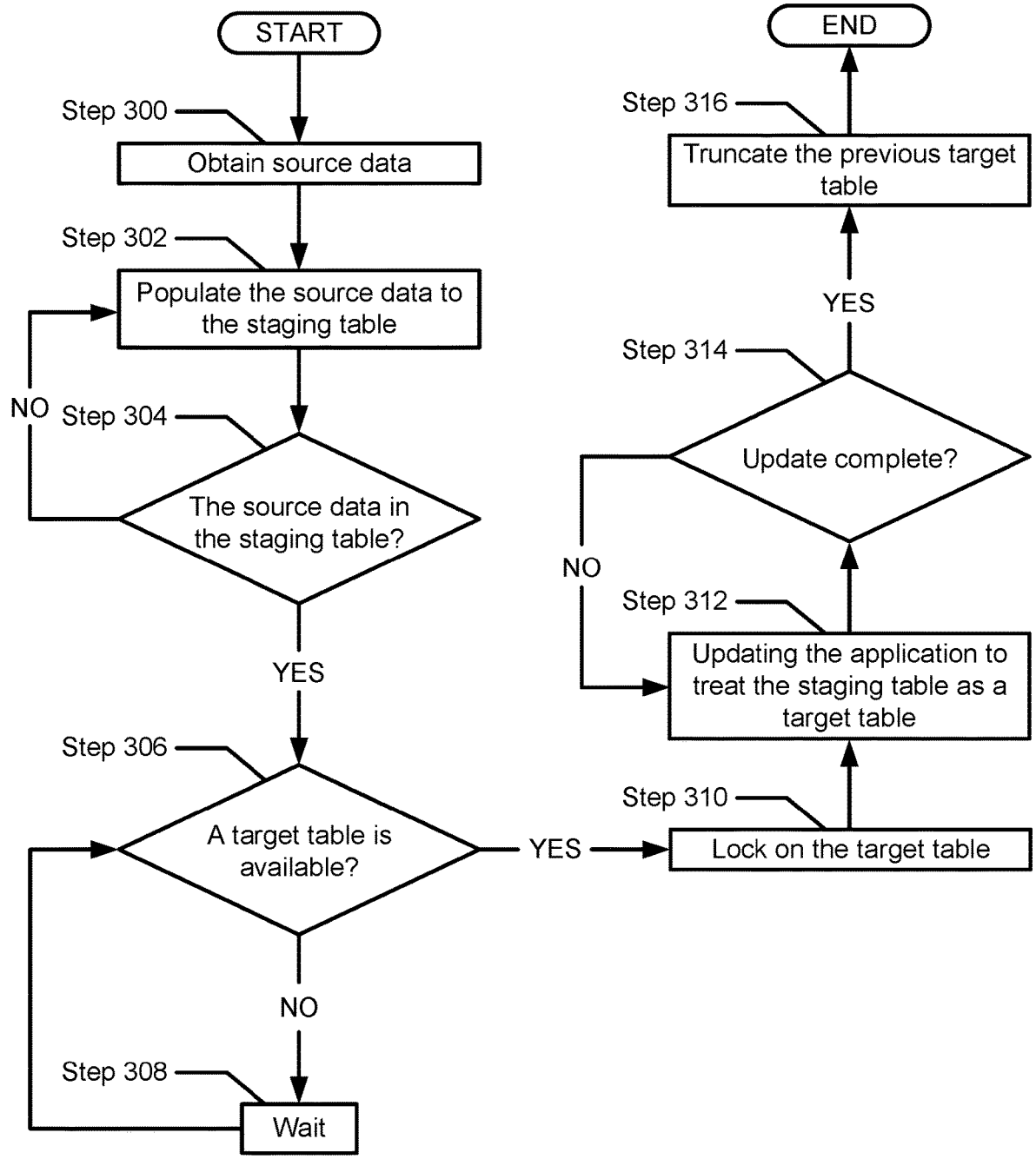
FIG. 3 shows a method to perform data transfer in accordance with one or more embodiments disclosed herein.

FIG. 3 shows a flowchart in accordance with one or more embodiments disclosed herein. While the various steps in the flowchart are presented and described sequentially, one of ordinary skill in the relevant art will appreciate that some or all of the steps may be executed in different orders, may be combined or omitted, and some or all steps may be executed in parallel without departing from the scope of the embodiments disclosed herein.

Turning now to FIG. 3, FIG. 3 shows a method to perform data transfer in accordance with one or more embodiments disclosed herein. The method shown in FIG. 3 may be performed by, for example, the production host environment (e.g., 130, FIG. 1). Other components of the system illustrated in FIG. 1 may perform the method of FIG. 3 without departing from the scope of the embodiments disclosed herein.

In Step 300, source data is obtained. In one or more embodiments disclosed herein, based on the request received from the client (e.g., client A (120A), client L (120L), FIG. 1), the ETL agent (e.g., 202, FIG. 2) may obtain the source data (e.g., 204, FIG. 2) from persistent storage. Information related to the application (e.g., 210, FIG. 2), which will use the source data, may be obtained prior to obtaining the source data.

In one or more embodiments disclosed herein, the information related to the application (e.g., 210, FIG. 2) may include, but it is not limited to: application version information, computing device information of the client(s) (e.g., client A (120A), client L (120L), FIG. 1), operating system configuration information of the client(s), etc. The information related to the application may include other details without departing from the scope of the embodiments disclosed herein.

In one or more embodiments disclosed herein, the operating system configuration information of the client(s) may specify the configuration of a set of clients that requested the data transfer. The configuration may be associated with, for example, a current version of the operating system of a set of clients, the number of processors (e.g., central processing unit (CPU)), the amount of memory available for the client, a number of applications executing on the client, and the amount of available persistent storage on each of the clients. Other configurations may be specified in the operating system configuration information without departing from the scope of the embodiments disclosed herein.

In one or more embodiments disclosed herein, prior to Step 302, a staging table is generated at the time a target table is generated, in which the staging table may be generated by the ETL agent.

Continuing with the discussion of FIG. 3, in Step 302, the staging table is populated with the source data. In one or more embodiments disclosed herein, the ETL agent may populate the staging table with the source data in response to receiving the data transfer request(s) received from the client(s).

In Step 304, the ETL agent performs a first determination to determine whether the source data was successfully populated to the staging table. If the result of the first determination is YES, the ETL agent determines that the source data was successfully populated to the staging table and the method proceeds to Step 306. If the result of the first determination is NO, the ETL agent determines that the source data was not successfully populated to the staging table and the method returns to Step 302.

In one or more embodiments disclosed herein, during the first determination, data availability in the staging table is ensured for the upcoming steps in the method of one or more embodiments. Further, the performance of the data transfer process is advantageously improved by preventing the method from moving forward when the source data is not present in the staging table.

In Step 306, the ETL agent performs a second determination to determine whether the target table (e.g., 208, FIG. 2) is available. If the result of the second determination is YES, the ETL agent determines that the target table is available and the method proceeds to Step 310. If the result of the second determination is NO, the ETL agent determines that the target table is not available and the method proceeds to Step 308.

In one or more embodiments disclosed herein, during the second determination, an application (e.g., 210, FIG. 2) may be directed to use data stored in the target table.

In Step 308, the method waits at low priority until previously received queries (which are specified as high priority queries) to the target table are completed (i.e., the performance of the method is put on hold by the ETL agent until the high priority queries are completed). In this manner, the high priority queries will be processed without causing any possible system blockage. In one or more embodiments disclosed herein, the high priority queries may be related to the application's use of the data stored in the target table (e.g., reading data from the target table, writing data to the target table, etc.). The previously received queries may include other implementations by the application without departing from the scope of the embodiments disclosed herein.

In Step 310, a lock on the target table is obtained prior to initiating a data source switch. In one or more embodiments disclosed herein, the lock on the target table prevents other users from making changes to the target table while a particular user is accessing the target table. For example, while client A (e.g., 120A, FIG. 1) is reading data from the target table, client L (e.g., 120L, FIG. 1) cannot make any changes (e.g., writing data to the target table) to the target table. In one or more embodiments disclosed herein, the lock on the target table may be implemented using software, hardware, or any combination thereof.

In Step 312, based on the first determination and the second determination (e.g., based on at least both the first determination and the second determination being YES), the data source switch of the application is initiated. In one or more embodiments disclosed herein, the data source switch may be initiated by the ETL agent. Further, the data source switch directs the application to use the source data in the staging table instead of the data in the target table. In this manner, the application is updated to treat the staging table as a target table, which makes the data source switch process close to instantaneous (e.g., on the order of milliseconds or less time frame). Thus, the downtime of the application is minimal and possible maintenance overhead may be reduced due to less data processing throughout the data transfer process. Additional details regarding the data source switch are described below in reference to FIGS. 4.1-4.4.

In Step 314, the ETL agent performs a third determination about whether the update to treat the staging table as the target table is completed. If the result of the third determination is YES, the ETL agent determines that the update to treat the staging table as the target table is completed (i.e., data source switch was successful) and the method proceeds to Step 316. If the result of the third determination is NO, the ETL agent determines that the update to treat the staging table as the target table is not completed (i.e., data source switch was unsuccessful) and the method returns to Step 312.

In one or more embodiments disclosed herein, based on the third determination, if the data source switch was unsuccessful, the application may continue to use the data from the target table. Further, an error notification and/or an error message regarding the unsuccessful data source switch may be sent to the client. This error message may describe (e.g., specify) why the data source switch was unsuccessful such that the user will be provided with better context about the unsuccessful data source switch. The error notification and/or the error message regarding the unsuccessful data source switch may be sent to the client between Step 312 and Step 314.

In Step 316, based on the third determination, if the data source switch was successful, the staging table becomes a new target table, which includes the source data that was stored in the staging table before it became the new target table. In one or more embodiments disclosed herein, after the staging table has become the new target table, the previous target table (e.g., the current version being stored in the production host environment) is truncated (i.e., deleting all data and/or records from the table). In one or more embodiments disclosed herein, the previous target table may be truncated by the ETL agent.

In one or more embodiments disclosed herein, the method ends following Step 316.

The embodiment shown in FIG. 3 enables users (e.g., the clients (e.g., 120, FIG. 1)) to perform close to instantaneous data transfer to the application by ensuring data availability at any time during the entire data transfer process. In this manner, as the data source of the application is updated, the application may continue to use the existing target table to continue providing services to the users regardless of whether the data source of the application was properly switched from the existing target table to the staging table.

In one or more embodiments disclosed herein, a visualization module (not shown) may include functionality to generate visualizations (e.g., a graphical user interface that shows current status of the data source switch and/or an entry related to the availability of the target table, etc.) of the method illustrated in FIG. 3. The visualization module may be implemented using hardware, software, or any combination thereof.

Start of Example

The following section describes an example of one or more embodiments. The example, illustrated in FIGS. 4.1-4.4, is not intended to limit the scope of the embodiments disclosed herein and is independent from any other examples discussed in this application.

Turning to the example, consider a scenario in which a data source switch is performed for an application executing on a client. Initially, FIG. 4.1 shows a diagram of an example of a system (e.g., 100, FIG. 1). For the sake of brevity, not all components of the example system may be illustrated in FIG. 4.1. For example, the example system may include a client (not shown) that executes an application (410).

Based on a data source switch request received from the client, an ETL agent (402) of a production host environment (400) obtains source data (404) and an existing empty staging table (406) from persistent storage. Prior to obtaining the source data, the ETL agent (402) obtains application version information and operating system configuration information from the client.

At this time, the application (410) is directed to use data in a target table (i.e., current target table (408)) to provide services to the client.

Turning now to FIG. 4.2, FIG. 4.2 shows a diagram of the example system at a later point in time. In response to receiving the data source switch request from the client, the ETL agent (402) starts to populate the staging table (406) with the source data (404). Following the population, the ETL agent (402) makes a first determination that the source data (404) was successfully populated to the staging table (406). Following the first determination, the ETL agent (402) makes a second determination that the target table (i.e., current target table (408)) is available. At this time, the application (410) is still using data from the target table (i.e., current target table (408)) to provide services to the client.

Turning now to FIG. 4.3, FIG. 4.3 shows a diagram of the example system at yet a later point in time. Following the completions of the first determination and the second determination, the ETL agent (402) obtains a lock on the target table (i.e., current target table (408)). In response to obtaining the lock on the target table, the ETL agent (402) initiates the data source switch of the application (410) to direct the application to use the source data (404) in the staging table (406) instead of using data from the target table (i.e., current target table (408)). At this time, in response to the data source switch, the application (410) starts using the source data (404) in the staging table (406) to provide services to the client.

Finally, turning to FIG. 4.4, FIG. 4.4 shows a diagram of the example system at yet an even later point in time after the process discussed above in FIG. 4.3. After the application (410) is directed to use the source data (404) in the staging table (e.g., 406, FIG. 4.3), the staging table becomes a new instance of the target table (406), which includes the source data (404) from the staging table before the staging table became the new instance of the target table.

In response to the staging table becoming the new instance of the target table (406), the ETL agent (402) makes a third determination that the data source switch was successful. Following the completion of the third determination, the ETL agent (402) truncates (i.e., deleting all data and/or records from the table) the previous target table (i.e., the target table before the data source switch; 408 in FIG. 4.3).

At this time, in response to the data source switch, the staging table becomes the target table (406) and the previous target table becomes an empty staging table (408).

End of Example

Turning now to FIG. 5, FIG. 5 shows a diagram of a computing device in accordance with one or more embodiments disclosed herein.

In one or more embodiments disclosed herein, the computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), an input device(s) (510), an output device(s) (508), and numerous other elements (not shown) and functionalities. Each of these components is described below.

In one or more embodiments disclosed herein, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN), such as the Internet, mobile network, or any other type of network) and/or to another device, such as another computing device.

In one or more embodiments disclosed herein, the computing device (500) may include one or more output devices (508), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

The problems discussed above throughout this document should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of the embodiments disclosed herein. Accordingly, the scope of the embodiments described herein should be limited only by the attached claims.

What is claimed is:

1. A method for performing data transfer, the method comprising:
    receiving, by a computing device (CD), a request from a user via a client to obtain source data, wherein the CD comprises at least first integrated circuitry (IC) that performs computer implemented functionalities for the user, wherein the client comprises at least second IC that provides services to the CD, wherein the CD is operably connected to the client via a combination of wired and wireless connections;
    obtaining, based on the request, information of an application that will use the source data and the source data, wherein the information is obtained prior to obtaining the source data, wherein the information specifies at least one selected from a group consisting of a version of the application, a CD detail of the client, and an operating system configuration detail of the client;
    populating, based on the request, a staging table with the source data;
    making a first determination that the source data was successfully populated to the staging table;
    making a second determination that a target table is available, wherein the application is directed to use data in the target table;
    obtaining a hardware lock on the target table, wherein the lock prevents a second user from making a change to the target table while the user is accessing the target table; and
    initiating, based on the first determination and the second determination, a data source switch of the application, wherein the data source switch directs the application to use the source data in the staging table and not use the data in the target table wherein the application uses the source data in the staging table when the data source switch is successful.

2. The method of claim 1, further comprising:
    making a third determination that the data source switch was successful, wherein the application uses the source data in the staging table when the data source switch was successful; and
    truncating, based on the third determination, the target table.

3. The method of claim 1, wherein the data source switch is processed after previously received queries to the target table are completed.

4. The method of claim 1, wherein the staging table and the target table are located in a database in a production environment.

5. The method of claim 1, wherein the source data is located on the client.

6. A non-transitory computer readable medium comprising computer readable program code, which when executed by a computer processor enables the computer processor to perform a method for performing data transfer, the method comprising:
    receiving, by a computing device (CD), a request from a user via a client to obtain source data, wherein the CD comprises at least first integrated circuitry (IC) that performs computer implemented functionalities for the user, wherein the client comprises at least second IC that provides services to the CD, wherein the CD is operably connected to the client via a combination of wired and wireless connections;
    obtaining, based on the request, information of an application that will use the source data and the source data, wherein the information is obtained prior to obtaining the source data, wherein the information specifies at least one selected from a group consisting of a version of the application, a CD detail of the client, and an operating system configuration detail of the client;
    populating, based on the request, a staging table with the source data;
    making a first determination that the source data was successfully populated to the staging table;

making a second determination that a target table is available, wherein the application is directed to use data in the target table;
obtaining a hardware lock on the target table, wherein the lock prevents a second user from making a change to the target table while the user is accessing the target table; and
initiating, based on the first determination and the second determination, a data source switch of the application, wherein the data source switch directs the application to use the source data in the staging table and not use the data in the target table making a third determination that the data source switch was unsuccessful;
generating, based on the third determination, an error message describing why the data source switch was unsuccessful; and
directing, based on the third determination, the application to use the data in the target table.

7. The non-transitory computer readable medium of claim 6, wherein the data source switch is processed after previously received queries to the target table are completed.

8. The non-transitory computer readable medium of claim 6, wherein the staging table and the target table are located in a database in a production environment.

9. The non-transitory computer readable medium of claim 6, wherein the source data is located on the client.

10. A system for performing data transfer, the system comprising:
a processor comprising circuitry;
memory comprising instructions, which when executed perform a method, the method comprising:
receiving, by a computing device (CD), a request from a user via a client to obtain source data, wherein the CD comprises at least first integrated circuitry (IC) that performs computer implemented functionalities for the user, wherein the client comprises at least second IC that provides services to the CD, wherein the CD is operably connected to the client via a combination of wired and wireless connections;
obtaining, based on the request, information of an application that will use the source data and the source data, wherein the information is obtained prior to obtaining the source data, wherein the information specifies at least one selected from a group consisting of a version of the application, a CD detail of the client, and an operating system configuration detail of the client;
populating, based on the request, a stating table with the source data;
making a first determination that the source data was successfully populated to the staging table;
making a second determination that a target table is available, wherein the application is directed to use data in the target table;
obtaining a hardware lock on the target table, wherein the lock prevents a second user from making a change to the target table while the user is accessing the target table; and
initiating, based on the first determination and the second determination, a data source switch of the application, wherein the data source switch directs the application to use the source data in the staging table and not use the data in the target table,
wherein the application uses the source data in the staging table when the data source switch is successful.

11. The system of claim 10, further comprising:
making a third determination that the data source switch was successful, wherein the application uses the source data in the staging table when the data source switch was successful; and
truncating, based on the third determination, the target table.

12. The system of claim 10, wherein the data source switch is processed after previously received queries to the target table are completed.

13. The system of claim 10, wherein the staging table and the target table are located in a database in a production environment.

* * * * *